April 18, 1933.  C. KNOBLOCH  1,904,865
SPEEDOMETER FOR MARINE CRAFT
Filed Oct. 10, 1928
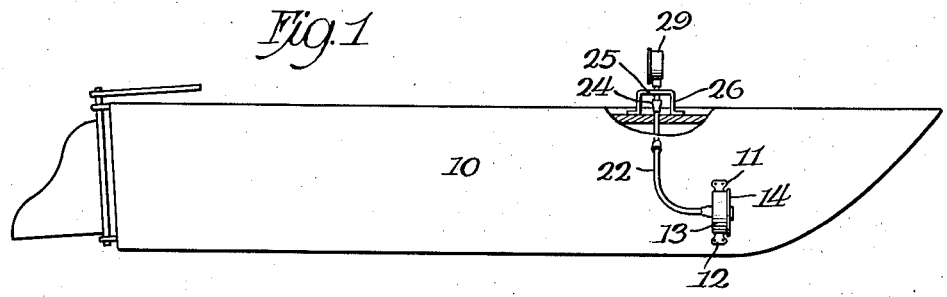
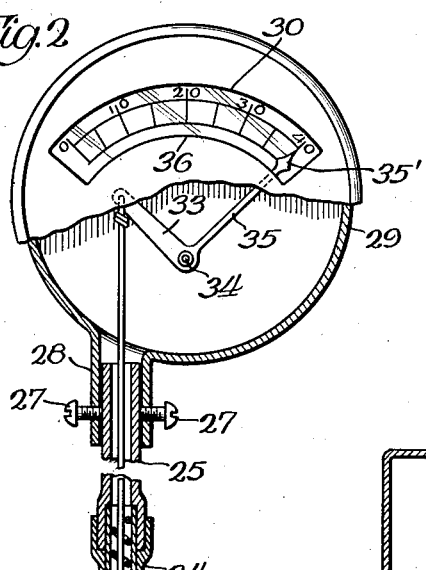
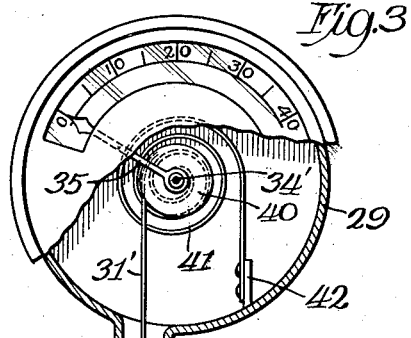
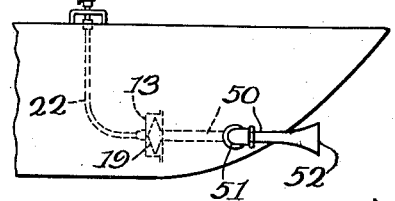
Inventor:
Carl Knobloch
By Fisher, Clapp, Soans & Pond, Attys.

Patented Apr. 18, 1933

1,904,865

UNITED STATES PATENT OFFICE

CARL KNOBLOCH, OF AKRON, OHIO

SPEEDOMETER FOR MARINE CRAFT

Application filed October 10, 1928. Serial No. 311,611.

This invention relates to speed measuring devices and has reference more particularly to a speedometer adapted to accurately gage the speed of vessels, boats and all kinds of marine craft; the invention being particularly useful in connection with high speed motor boats.

Heretofore, so far as I am aware, speed measuring devices applied to water craft have, for various reasons, lacked a high degree of accuracy and reliability; and one object of the present invention is to provide a speedometer based upon a novel principle of operation that will register the speed of the boat with a high degree of accuracy. Another object is to provide a speedometer of very simple and inexpensive construction, capable of being readily applied to existing craft, and capable of registering reliably the high speeds attained by motor boats of the racing type as well as the slower speeds of pleasure and commercial craft. The speedometer of my present invention operates upon the principle of employing the resistance thrust of the water, when the boat is traveling, which increases as the speed increases, to actuate a diaphragm attached to the boat and subjected to the back thrust of the water, the movement of the diaphragm being transmitted to a speed registering device on the boat; and other objects and attendant advantages of the invention will be apparent to persons familiar with devices of this class from the following detailed description, when taken in connection with the accompanying drawing in which I have illustrated a simple and practical embodiment of the principle of the invention, with two types of movement-transmitting devices between the diaphragm and the dial pointer, and in which—

Fig. 1 is a diagrammatic side elevation of a motor boat showing my improved speedometer mounted thereon;

Fig. 2 is an enlarged sectional view of the speedometer attachment itself;

Fig. 3 is a partly sectional view corresponding to the upper portion of Fig. 2 and showing a modified means for actuating the dial pointer;

Fig. 4 is a diagrammatic view in side elevation, showing the diaphragm casing and diaphragm mounted inside the boat, with a tube extending to the outside to afford access of the water to the diaphragm.

Referring to the drawing, 10 may designate as an entirety a motor boat or other water craft. Attached by any suitable means, such as brackets 11 and 12 to the side of the boat 10 is a cylindrical diaphragm casing 13 provided with a front cover-plate 14 suitably attached thereto as by screws 15 with an annular washer 16 to render the interior of the casing 13 water-tight.

The cover-plate 14 is formed with a central hole 17 through which extends a hollow exteriorly threaded bushing 18 formed with a flange 18′ on its inner end to centrally clamp the front fold of an expansile and contractile bellows diaphragm 19 that is housed within the casing 13; the bushing 18 being secured by a nut 20. On the back wall of the casing 13 is a hollow boss 21 into which is tightly fitted one end of a rubber or other water-proof tube 22 secured in place by a suitable coupling 23. The tube 22 extends upwardly alongside the boat 10, either through an opening well above the water line, as indicated in Fig. 1, or to a point above the top edge of the hull, where its upper end is connected by a suitable coupling 24 to a vertical tube 25 that is rigidly mounted on the boat as, for example, by a bracket 26. Attached to and adjustable up and down on the tube 25 by one or more set screws 27 is the tubular neck 28 of an indicator casing 29. On the face of the casing 29 is a speed-indicating scale 30. Attached to the center of the rear fold of the diaphragm 19 is a wire 31 that extends through a reinforcing wire spiral 32 within the flexible tube 22, and up through the fixed tube 25, being connected at its upper end to an arm 33 fast on the arbor shaft 34 of the indicator. Fast on the same arbor shaft 34 is a pointer 35 having a pointer tip 35' extending through an arcuate slot 36 in the front wall of the casing and playing over the scale 30. The slot 36 also serves as an atmospheric vent for the diaphragm casing 13.

The bellows 19 normally tends to contract under the natural resiliency of its folds to a substantially flat condition, and when it thus contracts, it obviously draws the scale pointer 35 to or near the zero position on the scale 30. If, with the bellows diaphragm fully collapsed, the pointer lies slightly to one side or the other of the zero position, it can be easily placed exactly at the zero point by raising or lowering the scale casing on the tube 25 and fixing it in adjusted position by the set screws 27.

In the practical operation of the device, when the boat starts to travel forwardly, with the bellows casing, or at least the central opening 18 thereof submerged, the water rushes into and expands the bellows diaphragm, thereby, through the wire 31, advancing the pointer 35 over the dial scale. As the speed increases, the internal pressure of the water in the bellows diaphragm correspondingly increases, and the scale pointer is correspondingly advanced. As the speed of the boat is reduced, the internal water pressure is correspondingly slackened or reduced, and the consequent contracting movement of the diaphragm draws the scale pointer backwardly.

Fig. 3 illustrates another form of operating connection between the bellows diaphragm and the arbor of the indicator. In this device the rear fold of the bellows is connected by a flexible cord 31' to a pulley 40 fast on the arbor 34' of the indicator, and a clock spring 41 anchored at its inner end to the arbor 34' and at its outer end to a lug 42 on the indicator casing constantly tends to advance the pointer 35 upwardly along the scale. The elasticity of the diaphragm 19 under which it collapses when empty is, however, much greater than the pull of the spring 41, so that when the diaphragm is empty and collapsed, the scale pointer stands at zero. As the bellows begins to expand, the cord 31' is, of course, slackened, and this slack is constantly taken up by the pull of the spring 41, thus advancing the scale pointer up the scale.

Manifestly either of the two forms of indicator and indicator connection to the bellows may be employed as well as any other suitable or convenient form or type of indicator.

The diaphragm, and its casing when employed, may be mounted inside the boat, as illustrated in Fig. 4. In such case, a tube 50 connected to or formed as an extension of the bushing 18 leads through a suitably packed hole 51 in the hull of the boat and preferably terminates in a flaring mouth 52; this tube serving, like the bushing 18 of Fig. 2, as a means for subjecting the diaphragm to the back thrust of the water during the travel of the boat.

I claim—

1. A speedometer for boats, comprising in combination a diaphragm casing formed with a water inlet opening, means for venting said casing to the atmosphere, and means for attaching said casing to and externally of a boat with said opening below the water line of the boat, a self-collapsing bellows diaphragm mounted in said casing and having an opening in one fold thereof registering and communicating with said water inlet opening, a speed registering indicator adapted to be mounted on the boat, and a connection between the other fold of said diaphragm and said indicator through which a flexing movement of said diaphragm is transmitted to said indicator.

2. A speedometer for boats, comprising in combination a diaphragm casing formed with openings in its front and rear walls relatively to the direction of forward travel of the boat, means for venting said casing to the atmosphere, and means for attaching said casing to and externally of a boat with said front wall opening below the water line of the boat, a self-collapsing bellows diaphragm mounted in said casing, and having an opening in one fold thereof registering and communicating with said front wall opening, a speed registering indicator adapted to be mounted on the boat, a tube attached at one end to the rear wall of said casing registering and communicating with said rear wall opening and the other end of the tube attached to said indicator, and a flexible movement-transmitting member connecting the other fold of said diaphragm to said indicator and extending through said tube.

3. A device as defined in claim 1 wherein said venting means includes a casing of said speed-registering indicator and said indicator casing has an opening which serves as an atmospheric vent for said diaphragm casing.

CARL KNOBLOCH.